(12) United States Patent
Kobayashi

(10) Patent No.: US 8,749,708 B2
(45) Date of Patent: Jun. 10, 2014

(54) MOVING IMAGE PROCESSING APPARATUS AND MOVING IMAGE PROCESSING METHOD

(75) Inventor: Kiwamu Kobayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 216 days.

(21) Appl. No.: 13/132,403

(22) PCT Filed: Dec. 7, 2009

(86) PCT No.: PCT/JP2009/070786
§ 371 (c)(1),
(2), (4) Date: Jun. 2, 2011

(87) PCT Pub. No.: WO2010/079669
PCT Pub. Date: Jul. 15, 2010

(65) Prior Publication Data
US 2011/0234899 A1  Sep. 29, 2011

(30) Foreign Application Priority Data
Jan. 9, 2009  (JP) ................................. 2009-003991

(51) Int. Cl.
*H04N 7/01* (2006.01)
*H04N 11/20* (2006.01)

(52) U.S. Cl.
USPC ............................ 348/459; 348/447; 348/607

(58) Field of Classification Search
USPC .......... 348/625, 630, 441–459, 620–621, 607
See application file for complete search history.

(56) References Cited

U.S. PATENT DOCUMENTS

| 5,892,551 A * | 4/1999 | Uematsu ........................ 348/447 |
| 6,056,408 A | 5/2000 | Kobayashi |
| 7,728,909 B2 * | 6/2010 | Poon .............................. 348/451 |
| 8,077,258 B2 * | 12/2011 | Take et al. ..................... 348/448 |
| 2006/0227249 A1 | 10/2006 | Chen et al. |

(Continued)

FOREIGN PATENT DOCUMENTS

| JP | 06-070288 A | 3/1994 |
| JP | 2002-351382 A | 12/2002 |

(Continued)

OTHER PUBLICATIONS

Notification of Transmittal of the International Search Report and the Written Opinion of the International Searching Authority dated Jan. 12, 2010, International Search Report, and Written Opinion in related corresponding PCT International Application No. PCT/JP2009/070786.

*Primary Examiner* — Michael Lee
(74) *Attorney, Agent, or Firm* — Fitzpatrick, Cella, Harper & Scinto

(57) ABSTRACT

In order to distribute low-frequency component image data L in image data for one frame to first and second sub-frames respectively as L1 and L2, a distribution of L2 in the low-frequency component image data L is decided. This decision is made based on a non-linear curve, so that when the low-frequency component image data L falls within a low-level region, a distribution rate of L2 is decreased, and when the low-frequency component image data L falls within a high-level region, the distribution rate of L2 is increased within a range that does not exceed 0.5. In this way, a negative-side clipping phenomenon of high-frequency components is suppressed in the low-level region, and flickers are suppressed in the high-level region.

19 Claims, 11 Drawing Sheets

(56) References Cited

U.S. PATENT DOCUMENTS

| | | | |
|---|---|---|---|
| 2009/0040374 A1* | 2/2009 | Kobayashi | 348/448 |
| 2009/0073192 A1 | 3/2009 | Kobayashi | |
| 2009/0310018 A1 | 12/2009 | Sakashita et al. | |
| 2010/0303374 A1* | 12/2010 | Mizuno | 382/260 |
| 2011/0007213 A1 | 1/2011 | Kobayashi | |

FOREIGN PATENT DOCUMENTS

| | | |
|---|---|---|
| JP | 2006-184896 A | 7/2006 |
| JP | 2007-304206 A | 11/2007 |
| JP | 2009-042481 A | 2/2009 |
| JP | 2009-042482 A | 2/2009 |
| JP | 2009-044460 A | 2/2009 |

* cited by examiner

MOVING IMAGE PROCESSING APPARATUS AND MOVING IMAGE PROCESSING METHOD

TECHNICAL FIELD

The present invention relates to a moving image processing apparatus which generates images of respective frames upon multiplying the frame frequency of an input moving image by N, and a moving image processing method thereof.

BACKGROUND ART

Conventionally, CRTs were representative of moving image display devices such as televisions. However, in recent years, so-called liquid crystal displays, plasma displays, FED displays, and the like are put into practical use, and displays of various display systems exist together. Respective display systems have different display methods. For example, in display devices based on a liquid crystal device (a direct-view type liquid crystal display device, liquid crystal rear projector, liquid crystal front projector, etc.), a plurality of scan methods are used. In any of these methods, a period in which each individual pixel outputs light occupies most of one frame. Therefore, such display device is called a hold-type display device.

On the other hand, in a CRT, FED, and the like, each individual pixel outputs light once per frame, and a time of emitting light is much shorter than a frame duration and is normally about 2 msec or less. Therefore, such display device is called an impulse-type display device.

Furthermore, display devices of types which are different from the aforementioned classifications such as a so-called plasma display and field sequential display are available.

The hold-type display device and impulse-type display device respectively have the following features.

1) Since the hold-type display device emits light in most of a frame time, the light intensity suffers a small temporal bias, and nearly no flickers are observed. However, when pursuit is made (to trace a moving part in a moving image by the line of sight), relatively large "moving blurring" is observed according to the duration of the period of emitting light within a frame. Note that "moving blurring" is different from that caused by response characteristics of a display device.

2) Since the impulse-type display device emits light within a very short time in a frame period, the light intensity suffers a large temporal bias, and flickers synchronized with frames are observed. However, nearly no "moving blurring" in pursuit is observed, and a resolution which is not much different from a still part can be obtained.

In general, periods of emitting light in display devices are different for respective display systems and display devices, and the features 1) and 2) are located at different ends based on their durations of the periods of emitting light. A period of emitting light is nearly proportional to the magnitude of moving blurring. That is, moving blurring in pursuit becomes larger as a period of emitting light in each system is longer. Conversely, moving blurring becomes smaller as a period of emitting light is shorter. On the other hand, fewer flickers synchronized with frames are observed as a period of emitting light is longer, and more flickers are observed as a period of emitting light is shorter. In this manner, the moving blurring and flickers have a tradeoff relationship in association with the period of emitting light.

A method of simultaneously solving these two problems is to multiply the frame frequency by N. In practice, in most cases, N=2, that is, the frame frequency is doubled. By doubling the frame frequency, the time of emitting light in each individual double-rate frame is halved and, therefore, moving blurring is nearly halved. On the other hand, as for flickers, for example, when an original frame frequency=60 Hz is doubled to 120 Hz, the frequency of flickers can be driven to fall outside the range of the response characteristics of the human eye. As a result, no flickers are observed.

In this way, effects of doubling the frame frequency (in general, multiplying the frame frequency by N) are great, but another problem is posed as follows.

For example, when an original frame frequency of an image signal is 60 Hz, information of an image is updated every 1/60 sec. Therefore, when this frame frequency is doubled to display images at 120 Hz, required information of an image is missing every other frame. As a measure to be taken against such problem first, for example, an identical image is displayed twice in case of a double rate. However, this method can solve flickers, but a problem of moving blurring is the same as that of an original image and cannot be solved. Also, in case of the impulse type, double images are observed according to the pursuit.

As a method of doubling the frame frequency without causing the aforementioned problems, a method of estimating and calculating an image between two frames by detecting a motion of an object of an original image is available, and is generally called, for example, an "intermediate image insertion method based on motion compensation". Using this method, original moving blurring is halved in the hold-type display device without increasing flickers, and double images are never displayed in the impulse-type display device.

However, this "intermediate image insertion method based on motion compensation" poses a problem of a huge arithmetic amount, a problem of causing estimation errors under a specific condition, that is, calculation errors of motion vectors, and so forth.

Hence, the following method is proposed. That is, with this method, an input image undergoes filter processing for respective frames to be separated into spatial high-frequency components largely associated with moving blurring and spatial low-frequency components largely associated with flickers. Then, the high-frequency components are concentrated on one sub-frame (one of two double-rate frames corresponding to an original frame), and the low-frequency components are distributed at arbitrary rates to both the sub-frames (both of the two double-rate frames corresponding to the original frame). (For example, Japanese Patent Laid-Open No. 6-70288 (to be referred to as reference 1 hereinafter), Japanese Patent Laid-Open No. 2002-351382 (to be referred to as reference 2 hereinafter), US 2006/0227249A1 (to be referred to as reference 3 hereinafter), and Japanese Patent Laid-Open No. 2006-184896 (to be referred to as reference 4 hereinafter)) This method will be referred to as a "method of separating an image into spatial frequencies and distributing them to sub-frames" hereinafter.

With the "method of separating an image into spatial frequencies and distributing them to sub-frames", first, in the hold-type display device, a hold time as a cause of moving blurring substantially matches a display time of high-frequency components. Therefore, by concentrating high-frequency components on one of double-rate sub-frames, the hold time is halved, that is, moving blurring caused by the hold time can be halved.

Since low-frequency components are displayed while being distributed to the entire frame (i.e., to both the sub-frames), no flickers at the frame frequency are generated when, for example, the distribution rates are even. Alternatively, when the rates are limited to fall within a predetermined range, flickers at the frame frequency can be suppressed to a negligible level.

With the "method of separating an image into spatial frequencies and distributing them to sub-frames", second, in the impulse-type display device, a sub-frame that displays high-frequency components is one of the double-rate sub-frames, that is, spatial high-frequency components are displayed only once. Therefore, as in a case in which impulse display is made once per frame, a state in which moving blurring is very small (or no double-blurring occurs) is realized. Since only low-frequency components are displayed on two sub-frames (i.e., they are displayed twice), no flickers at the frame frequency are generated if their rates are even. Alternatively, by limiting the rates to fall within a predetermined range, flickers at the frame frequency can be suppressed to a negligible level.

Furthermore, a method obtained by further improving the "method of separating an image into spatial frequencies and distributing them to sub-frames" is proposed. For example, when the frame rate is multiplied by N, spatial high-frequency components are temporally concentrated, and spatial low-frequency components are temporally dispersed. Then, deterioration of image quality in pursuit is suppressed by distributing the spatial high-frequency components and spatial low-frequency components so that the temporal barycenters of their display intensities are matched (for example, Japanese Patent Application No. 2007-207181 (to be referred to as reference 5 hereinafter), Japanese Patent Application No. 2007-207182 (to be referred to as reference 6 hereinafter), and Japanese Patent Application No. 2007-207185 (to be referred to as reference 7 hereinafter)).

However, the "method of separating an image into spatial frequencies and distributing them to sub-frames" suffers the following problems.

In this method, for example, when N=2, that is, when the frame rate is doubled (a frame is divided into two sub-frames), high-frequency components are displayed on one of the two sub-frames, and low-frequency components are displayed while being distributed to the two sub-frames. A sub-frame on which high-frequency components are displayed will be referred to as a high-frequency emphasized sub-frame, and the other sub-frame will be referred to as a high-frequency suppressed sub-frame hereinafter.

On the high-frequency emphasized sub-frame, the sum of all the high-frequency components and half of the low-frequency components or those at a predetermined rate is distributed. On the high-frequency suppressed sub-frame, half of the low-frequency components or the remaining low-frequency components of those at the predetermined rate are distributed. The high-frequency emphasized sub-frame is displayed by displaying the sum of all the high-frequency components and the distributed low-frequency components.

Assume that respective components are expressed as follows. That is, let A be an input image, H be high-frequency components, L be low-frequency components, SH be a high-frequency emphasized sub-frame, SL be a high-frequency suppressed sub-frame, L1 be low-frequency components displayed on the high-frequency emphasized sub-frame, and L2 be low-frequency components displayed on the high-frequency suppressed sub-frame.

According to the aforementioned definitions, the above description can be expressed by the following equations. When the low-frequency components L are evenly distributed to two sub-frames, we have:

$$SH=A-L2=H+L1=H+L/2 \quad (1\text{-}1\text{-}1)$$

$$SL=L2=L/2 \quad (1\text{-}1\text{-}2)$$

When the low-frequency components L are distributed like L1 and L2, i.e., L1+L2=L, their distribution rates are expressed as k1 and k2 by:

$$L1{:}L2=k1{:}k2 \text{ (for } k1+k2=1) \quad (1\text{-}2)$$

Then, the sub-frames expressed by equations (1-1-1) and (1-1-2) are expressed using k1 and k2 by:

$$SH=A-L2=H+L1=H+k1\times L \quad (1\text{-}3\text{-}1)$$

$$SL=L2=k2\times L \quad (1\text{-}3\text{-}2)$$

Note that the high-frequency components H are either positive or negative, but the low-frequency components L are always positive. In the original image A, a maximum amplitude on the negative side of the high-frequency components is the same as the level of the low-frequency components L, and that on the positive side is obtained by subtracting the low-frequency components L from a maximum value (luminance=100%) of image data.

Therefore, since L1<L in the high-frequency emphasized sub-frame SH, when H is negative and its absolute value is larger than L1, pixels that meet SH<0 appear. As for such pixels, although negative values can be expressed as SH on a mathematical expression, since an actual image display device cannot output negative light, these pixels can only be displayed as SH=0 unless an arbitrary special measure is taken.

A practical example will be described below. For example, when k1=k2=0.5, and when H=−15% and L=10% as a result of separation of the original image A=luminance 20% into H and L based on spatial frequencies using a filter, L1=L/2=5% and SH=H+L1=−10%. In this case, since negative display cannot be made as SH, SH=0 can only be displayed. At this time, since, for example, a still image of SH+SL can be observed by the human eye as a result of temporal integration, H of that portion is expressed by:

$$H=A-L=SH+SL-L=SH-L1=0\%-5\%=-5\%$$

According to the above equation, the depth, which is originally −15%, of a concave portion of the high-frequency components H is observed as a concave portion having the depth of −5%. This means occurrence of another problem in that, for example, a fine black shadow portion is displayed as a fine gray shadow. Such problem will be expressed as a "negative-side clipping phenomenon of high-frequency components" hereinafter. This "negative-side clipping phenomenon of high-frequency components" is conspicuous especially at low luminance.

DISCLOSURE OF INVENTION

The present invention provides a technique which enhances moving image visibility while suppressing flickers and the negative-side clipping phenomenon of high-frequency components when high-frequency components for one frame are concentrated on a first sub-frame and low-frequency components are distributed to first and second sub-frames.

According to a first aspect of the present invention, there is provided a moving image processing apparatus which concentrates high-frequency components in image data for one frame on a first sub-frame, and distributes low-frequency components to the first sub-frame and a second sub-frame upon generating image data of two sub-frames based on the image data for one frame, the apparatus comprising: an extraction unit configured to extract low-frequency components L from image data of a frame of interest; a distribution unit configured to decide a distribution of second low-frequency components L2 in the low-frequency components L so as to distribute the low-frequency components L to the first sub-frame SH and the second sub-frame SL as first low-frequency components L1 and the second low-frequency components L2; a first sub-frame generation unit configured to generate the first sub-frame SH as a sum of the first low-frequency components L1 in the low-frequency components L and high-frequency components H in the frame of interest by subtracting the second low-frequency components L2 from the image data of the frame of interest; and a second sub-frame generation unit configured to generate the second sub-frame SL based on the second low-frequency components L2, wherein when a level of the low-frequency components L falls in a low-level region in which the level is lower than a predetermined boundary level, the distribution unit sets a distribution rate of the second low-frequency components L2 to be relatively smaller than when the level of the low-frequency components L falls within a high-level region in which the level is higher than the boundary level, and when the level of the low-frequency components L falls within the high-level region, the distribution means sets the distribution rate of the low-frequency components L2 to be relatively larger within a range that does not exceed 0.5 than when the level falls within the low-level region.

According to a second aspect of the present invention, there is provided a moving image processing method which concentrates high-frequency components in image data for one frame on a first sub-frame, and distributes low-frequency components to the first sub-frame and a second sub-frame upon generating image data of two sub-frames based on the image data for one frame, the method characterized by comprising: an extraction step of extracting low-frequency components L from image data of a frame of interest; a distribution step of deciding a distribution of second low-frequency components L2 in the low-frequency components L so as to distribute the low-frequency components L to the first sub-frame SH and the second sub-frame SL as first low-frequency components L1 and the second low-frequency components L2; a first sub-frame generation step of generating the first sub-frame SH as a sum of the first low-frequency components L1 in the low-frequency components L and high-frequency components H in the frame of interest by subtracting the second low-frequency components L2 from the image data of the frame of interest; and a second sub-frame generation step of generating the second sub-frame SL based on the second low-frequency components L2, wherein in the distribution step, when a level of the low-frequency components L falls in a low-level region in which the level is lower than a predetermined boundary level, a distribution rate of the second low-frequency components L2 is set to be relatively smaller than when the level of the low-frequency components L falls within a high-level region in which the level is higher than the boundary level, and when the level of the low-frequency components L falls within the high-level region, the distribution rate of the low-frequency components L2 is set to be relatively larger within a range that does not exceed 0.5 than when the level falls within the low-level region.

Further features of the present invention will be apparent from the following description of exemplary embodiments with reference to the attached drawings.

BEST MODE FOR CARRYING OUT THE INVENTION

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

This embodiment displays a moving image based on the "method of separating an image into spatial frequencies and distributing them to sub-frames", which is described in the related art, and which concentrates high-frequency components in image data for one frame on a first sub-frame, and distributes low-frequency components to the first sub-frame and a second sub-frame. Then, this embodiment is characterized by suppressing the "negative-side clipping phenomenon of high-frequency components" at that time.

This embodiment will present an arrangement obtained by modifying that described in reference 5 proposed by the same inventors. However, when this embodiment is applied to arrangement examples described in references 3 and 4, the same effects can be obtained. Hence, the scope of the present invention also includes such arrangements.

Assume that a moving image processing apparatus according to this embodiment inputs an image signal having, for example, a frame frequency of 60 Hz, and outputs a signal for displaying an image at a display refresh rate of 120 Hz. That is, two output frames (sub-frames) of 1/120 sec are generated from a signal having the frame frequency of 60 Hz.

System Arrangement

Figure 1:
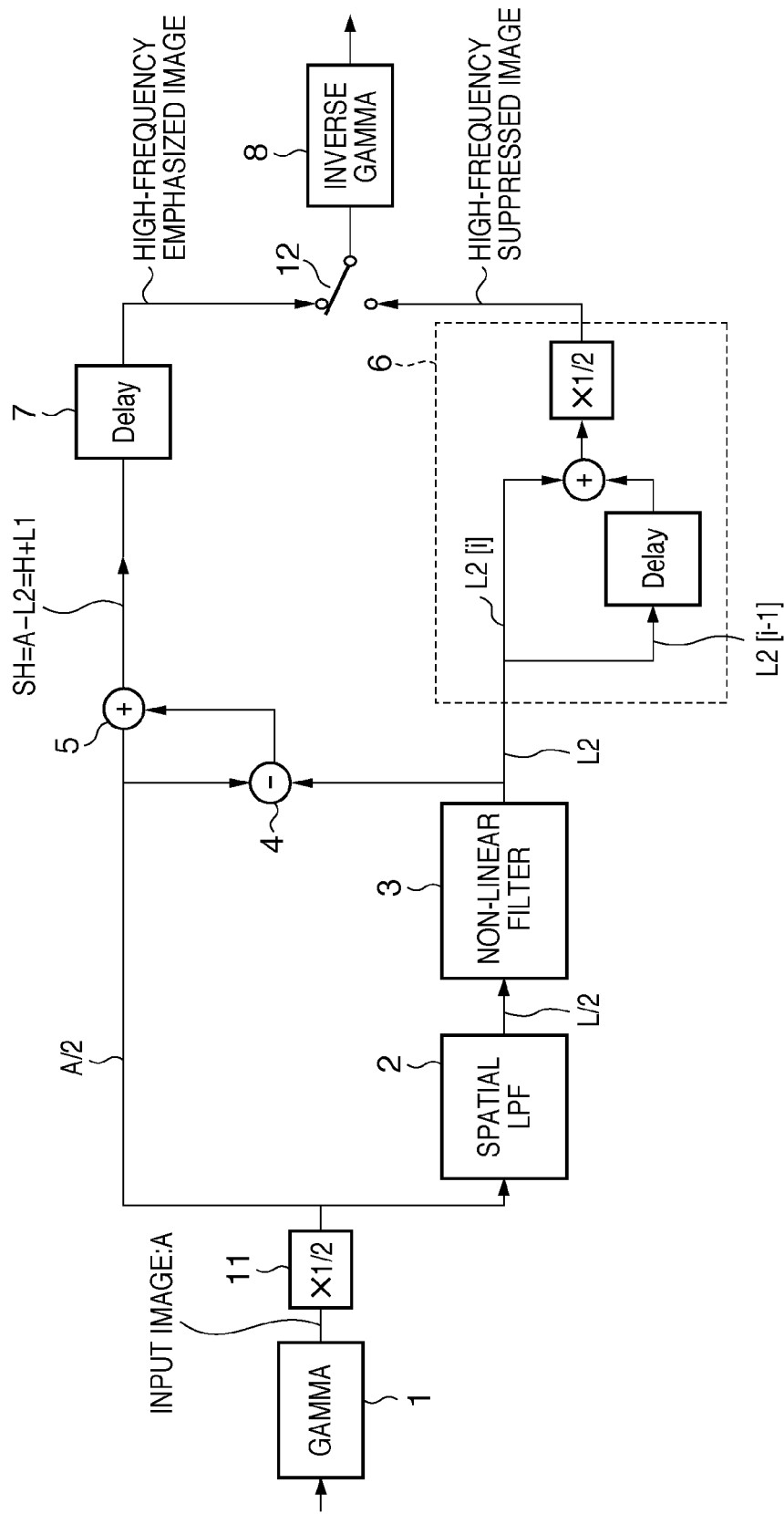
FIG. 1 is a block diagram showing the arrangement of a moving image processing apparatus according to the first embodiment of the present invention.

FIG. 1 is a block diagram showing the arrangement of a moving image processing apparatus according to this embodiment. Referring to FIG. 1, based on an input image A which is input for respective frames at a frame frequency of 60 Hz, a spatial high-frequency emphasized image SH as a first sub-frame and a spatial high-frequency suppressed image SL as a second sub-frame are generated. These images are switched by a switch 12 every 1/120 sec, thus outputting double-rate images.

In this embodiment, in an impulse-type display device, an output luminance level is set to be equivalent to a case in which an image is displayed once per frame at the frame frequency of 60 Hz. In a hold-type display device, the output luminance level is set to be equivalent to a case in which a display period is 50% at the frame frequency of 60 Hz (a black frame is inserted at remaining 50%). For this purpose, the apparatus includes a ×½ circuit 11. Note that the ×½ circuit 11 can be omitted to obtain luminance equivalent to that obtained when the display period ratio is 100% in a hold-type display device or that obtained when an image is displayed twice per frame in an impulse-type display device.

In this embodiment, arithmetic operations to be described later are defined with respect to a luminance level emitted by a display device. Therefore, the gamma of a display system is calculated first, and a gamma conversion circuit 1 having characteristics equivalent to that effective gamma is inserted. Then, after the gamma conversion circuit 1 converts an image into data proportional to the luminance of the display device, all arithmetic operations are executed. After completion of the arithmetic operations, the arithmetic result is restored to an original data format via an inverse gamma conversion circuit 8.

An input image A/2 output from the ×½ circuit 11 is branched into two, upper and lower paths in FIG. 1. The upper path serves as a first sub-frame generation unit, and the lower path serves as a second sub-frame generation unit. That is, the upper path generates the spatial high-frequency emphasized image SH as the first sub-frame, and the lower path generates the spatial high-frequency suppressed image SL as the second sub-frame.

In the lower path, spatial low-frequency components L (indicated by L/2 in FIG. 1) of the input image are extracted via a spatial low-pass filter (LPF) 2. In this embodiment, a spatial frequency used to separate the input image into high-frequency components H and the low-frequency components L is decided by a constant (a distance constant D; D=8 pixels in this embodiment) used to decide the upper limit of the pass band of this LPF 2.

After the spatial LPF 2 is applied, a non-linear filter 3 is further applied to generate low-frequency components L2 obtained by applying non-linear processing to the low-frequency components. The low-frequency components L2 are used to decide the high-frequency suppressed image SL. That is, in this embodiment, first low-frequency components L1 are distributed to the first sub-frame SH, and the second low-frequency components L2 are distributed to the second sub-frame SL.

As a function of the non-linear filter 3 with respect to L, a function F(L) with respect to the original low-frequency components L is defined. That is, L2=F(L). Note that L2=L/2 without any non-linear filter 3.

In the upper path, the low-frequency components L2 of the lower path are provided via a subtracter 4 and adder 5, thus calculating the high-frequency emphasized image SH. Letting L1 be low-frequency components of the high-frequency emphasized image SH, the image SH is expressed by SH=H+L1, and the low-frequency components L of the input image satisfy L=L1+L2. Distribution rates k1:k2 upon distributing the low-frequency components L to L1 and L2 in this way satisfy L1:L2=k1:k2 (for k1+k2=1). Note that a delay unit 7 delays the SH output timing by one frame to be synchronized with the SL output timing.

In this embodiment, as described also in above references 5, 6, and 7, the apparatus includes an inter-frame averaging circuit 6 to match the barycenters of display times of the low-frequency components L and high-frequency components H. In this way, the high-frequency suppressed image SL is defined by an average of the i-th L2 corresponding to the frame of interest and the (i−1)-th L2 corresponding to the immediately preceding frame, that is, SL[i]=(L2[i]+L2[i−1])/2. In the following description, a frame number [i] is appended in case of a description about averaging between frames, but the frame number [i] is omitted in case of a description which is not involved in averaging between frames.

The above description is summarized as:

$$L2=F(L) \quad (2\text{-}1)$$

$$L1+L2=L \quad (2\text{-}2)$$

$$SH=A-L2=H+L1 \quad (2\text{-}3)$$

$$SL[i]=(L2[i]+L2[i-1])/2 \quad (2\text{-}4)$$

When this embodiment is applied to above references 3 and 4, since the barycenters of the display times of the low-frequency components L and high-frequency components H need not be matched, the inter-frame averaging circuit 6 can be omitted. In this case, equation (2-5) below is used in place of equation (2-4) above:

$$SL=L2 \quad (2\text{-}5)$$

This embodiment aims at appropriately setting the distribution rates of L1 and L2, and this distribution rate is defined by characteristics F(L) of the non-linear filter 3. That is, L2 is decided by the characteristics F(L) of the non-linear filter 3, and L2 is subtracted from L based on equation (2-2) above, thus deciding L1. That is, in this embodiment, by defining the characteristics F(L) of the non-linear filter 3, the rates of L1 and L2 which form L are decided for each level of L, thereby deciding non-linear characteristics of SH and SL.

As described above, this embodiment is characterized by distributing L1 and L2 to attain both the flicker suppression effect based on the "method of separating an image into spatial frequencies and distributing them to sub-frames" and improvement of the "negative-side clipping phenomenon of high-frequency components" as an adverse effect of the above method.

In general, high-frequency components are not almost involved in flickers, which are decided by only a bias of low-frequency components. Since the high-frequency components have characteristics in which polarities are different for respective small regions, and become zero as a whole, even when flickers occur in small regions, they are averaged and cancel each other to zero in a broad region. On the other hand, since all the low-frequency components have a positive polarity, flickers of the low-frequency components appear intact as those for respective image regions.

Let FL be a difference (L1−L2) between L1 and L2 for each region or each level of L. This FL serves as a factor that roughly decides a human perception level of flickers.

Problems of this Embodiment

In order to help understanding this embodiment, problems to be solved by this embodiment in the general "method of separating an image into spatial frequencies and distributing them to sub-frames" will be described in detail below using low-frequency characteristics shown in FIGS. 3, 4, and 5.

Figure 3:
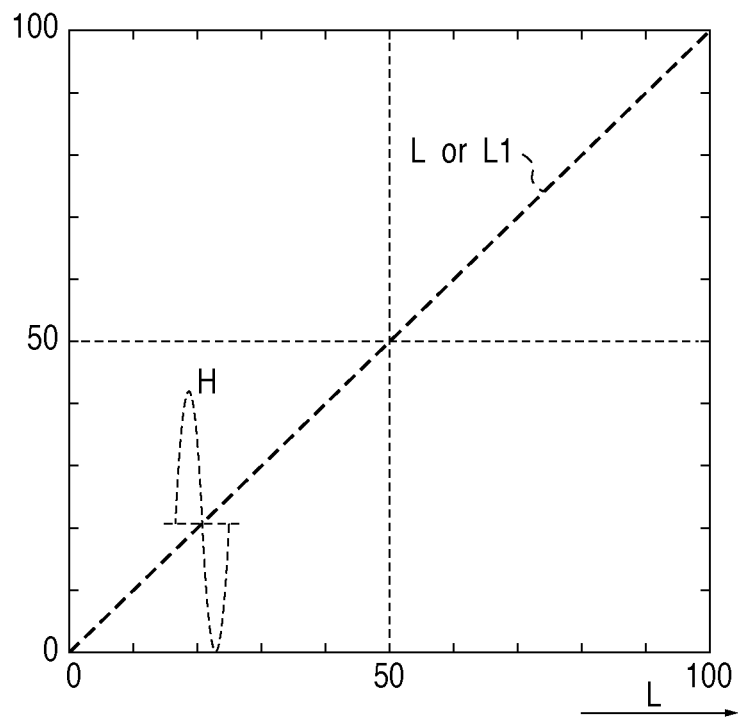
FIG. 3 is a graph showing an example of conventional low-frequency characteristics.
Figure 4:
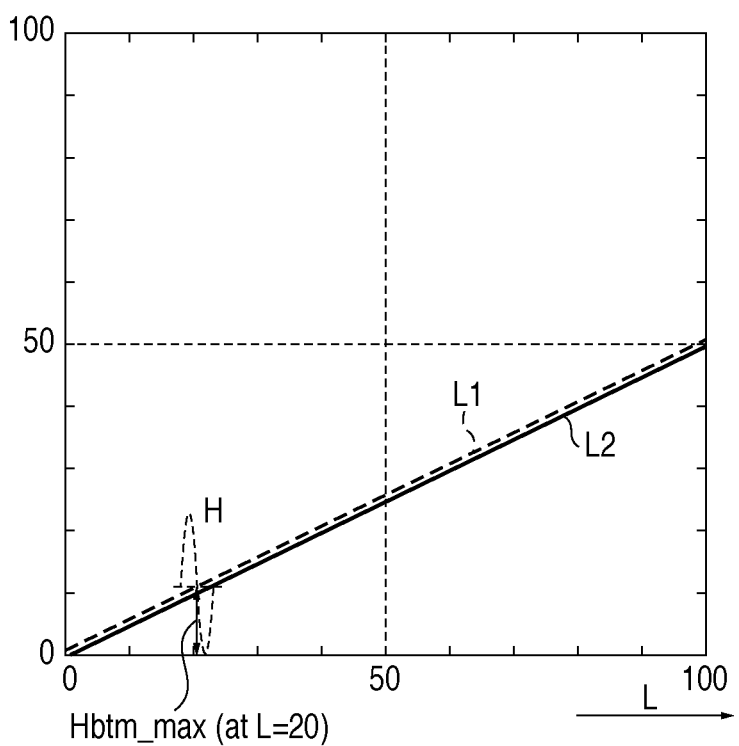
FIG. 4 is a graph showing an example of conventional low-frequency characteristics.
Figure 5:
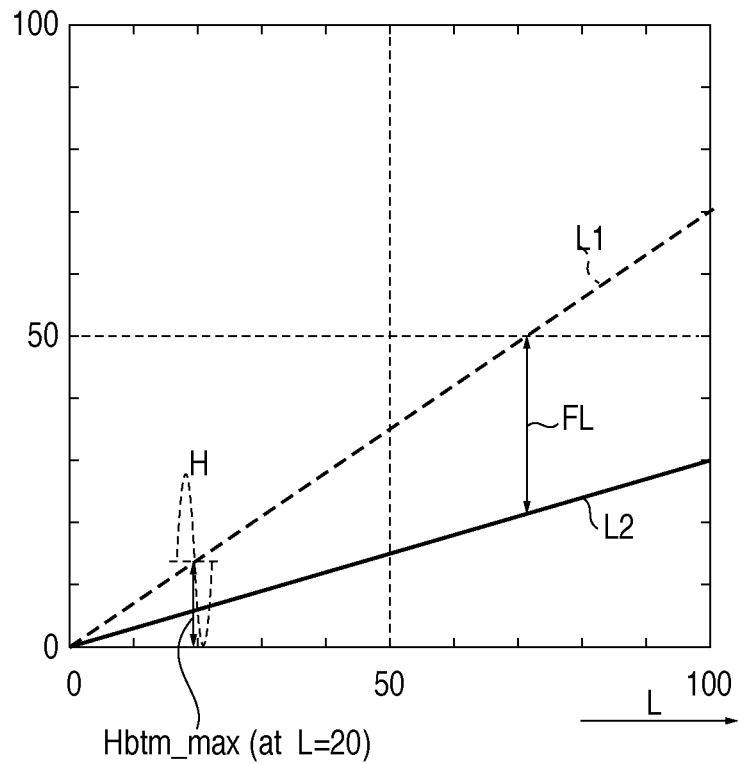
FIG. 5 is a graph showing an example of conventional low-frequency characteristics.

FIGS. 3, 4, and 5 have the same scale, the abscissa plots low-frequency components L (i.e., a double of the input L/2 of the non-linear filter 3 in FIG. 1) of the input image, and the ordinate plots low-frequency components L1 of SH and low-frequency components L2 of SL. That is, lines or curves shown in FIGS. 3, 4, and 5 express levels of L1 or L2 with respect to respective levels of the low-frequency components of the input image. Note that both the ordinate and abscissa express image data proportional to a display luminance level to have a minimum value=0 and a maximum value=100. For the sake of simplicity, the state of the high-frequency components H in the high-frequency emphasized sub-frame SH is used as one waveform of a sine curve or pulse waveform in terms of expression. Note that the high-frequency components H are superposed on L1 (indicated by the broken line in FIGS. 3, 4, and 5) in case of the "method of separating an image into spatial frequencies and distributing them to sub-frames". Therefore, a maximum value that the negative side can assume as the high-frequency components H is decided by the amplitude of L1, and a maximum value that the positive side can assume is decided by the degree of margin up to a luminance level=100 of L1.

FIG. 3 shows the low-frequency characteristics when SH=A and SL=0, that is, when all luminance components are displayed on the sub-frame SH. That is, since FIG. 3 shows the low-frequency characteristics equivalent to a display state at 60 Hz in place of a double rate, it also expresses the input image in this embodiment. In case of FIG. 3, since there is no distribution to L2, FL that decides flickers is always given as a maximum value like:

$$FL(L)=L-0=L \quad (3\text{-}1\text{-}0)$$

The high-frequency components H in this case can always assume a maximum amplitude as given by:

$$H\text{up\_max}=100-L \quad (3\text{-}1\text{-}1)$$

$$H\text{btm\_max}=L \quad (3\text{-}1\text{-}2)$$

where Hup_max is a maximum value of the amplitude that the positive side of the high-frequency components H can assume, and Hbtm_max is a maximum value that the negative side of the high-frequency components H can assume.

As will be described in detail later, in this embodiment, in order to suppress the "negative-side clipping phenomenon of high-frequency components" while suppressing flickers, the problem of how larger btm_max is assumed is to be solved.

FIG. 4 shows the low-frequency characteristics obtained by the arrangement described in references 3 and 4 or patent reference 5 proposed by the same inventors. In these arrangements, L1=L2=L/2, that is, the distribution rates of L1 and L2 are 0.5:0.5. An amplitude of flickers and a maximum amplitude of high-frequency components at that time are respectively given by:

$$FL=L1-L2=0 \quad (3\text{-}2\text{-}0)$$

$$H\text{up\_max}=100-L1=100-0.5L \quad (3\text{-}2\text{-}1)$$

$$H\text{btm\_max}=L1=0.5L \quad (3\text{-}2\text{-}2)$$

It should be noted that upon comparison of equation (3-2-2) with equation (3-1-2) associated with FIG. 3, the Hbtm_max value is halved. That is, the maximum amplitude that the minus side of the high-frequency components H can assume unwantedly becomes 0.5 L.

FIG. 5 shows the low-frequency characteristics obtained when the distribution rates of L1 and L2 are set to be 0.7:0.3 in the arrangement described in reference 5 proposed by the same inventors. An amplitude of flickers and a maximum amplitude of high-frequency components in this case are respectively given by:

$$FL=L1-L2=0.4L \quad (3\text{-}3\text{-}0)$$

$$H\text{up\_max}=100-L1=100-0.7L \quad (3\text{-}3\text{-}1)$$

$$H\text{btm\_max}=L1=0.7L \quad (3\text{-}3\text{-}2)$$

In case of FIG. 5, although the FL value is larger than that in FIG. 4, the Hbtm_max value is 0.7 times of that in FIG. 3.

As can be seen from the above description, the low-frequency characteristics shown in FIGS. 3, 4, and 5 are linear characteristics, and the maximum value that the amplitude on the negative side of the high-frequency components can assume becomes smaller although flickers are reduced in the order of FIG. 3, FIG. 5, and FIG. 4.

Thus, in order to balance flickers and the negative-side amplitude of the high-frequency components, a method of deciding the distribution rates of L1 and L2 in moderation unlike in FIGS. 3 and 4 but like in FIG. 5 is used first.

In general, when the level of L is low, Hbtm_max is limited to influence an image, that is, the negative side of H becomes relatively larger than L1, and the high-frequency emphasized image SH becomes negative and is clipped in calculation. As a practical example, especially in a shadow portion of an object in a relatively dark portion in an image, the negative-side amplitude of H tends to be large with respect to the L1 value. On the other hand, in a high-level region of L (a range in which a broad range is bright), the negative-side value of H rarely becomes relatively larger than the L1 value. Therefore, it is considered that the "negative-side clipping phenomenon of high-frequency components" can be suppressed by increasing the distribution rate of L1 especially at the low level of L to allow assuming a large Hbtm_max value.

On the other hand, from the aspect of flickers, according to the human visible characteristics, flickers are easy to see in a high luminance level portion, but they are difficult to see in a low luminance level portion. Based on this aspect, the distribution rates of L1 and L2 have to be prevented from being largely biased so as to obscure flickers in a high-level region of L. On the other hand, in a low-level region of L, the distribution rates of L1 and L2 can be biased to some extent.

Since suppression of the "negative-side clipping phenomenon of high-frequency components" and that of flickers just have compatible tendencies, this embodiment aims at balancing them. That is, in a low-level region of L, the distribution rate of L1 is set to be large in preference to Hbtm_max. In a high-level region of L, the bias of the distribution rates of L1 and L2 is set to be small so as to obscure flickers.

Non-Linear Filter Characteristics in this Embodiment

Figure 6:
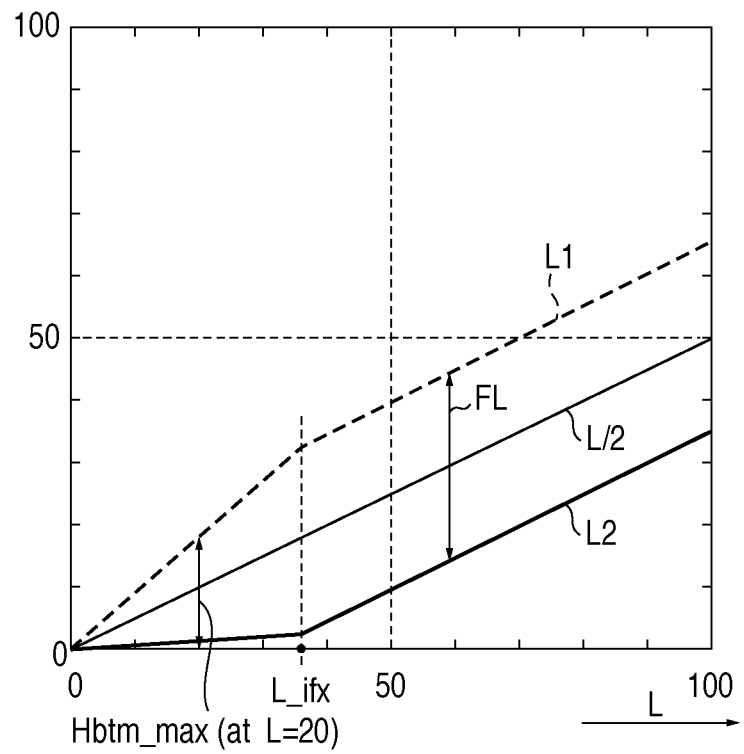
FIG. 6 is a graph showing non-linear characteristics of low-frequency components in the first embodiment.

As described above, in this embodiment, the distribution rate of L1 is set to be large in a low-level region of L, and the bias of the distribution rates of L1 and L2 is set to be small in a high-level region of L. FIG. 6 shows the low-frequency characteristics of this embodiment. The low-frequency characteristics shown in FIG. 6 are non-linear characteristics of L1 and L2 in the non-linear filter 3 of this embodiment. Note that FIG. 6 also has the same scale as in FIGS. 3, 4, and 5, and an L value as an inflection point of the characteristic curves (straight lines in FIG. 6) is represented by L_ifx. In this embodiment, this inflection point is used as a boundary level of L, and L is divided into a low-level region and high-level region.

In this embodiment, as shown in FIG. 6, when L is at a low level, that is, in a region L≤L_ifx, the slope of L2 is set to be 0.05. That is, the Hbtm_max value approaches the case of 1:0 shown in FIG. 3 by setting the distribution rates of L1 and L2 to be 0.95:0.05 to set an extremely large distribution rate of L1, as given by:

$$L1:L2=0.95:0.05 \text{ (region } L \leq L\_ifx) \quad (3\text{-}4\text{-}1)$$

$$Hbtm\_max=L1=L \times 0.95 \text{ (region } L \leq L\_ifx) \quad (3\text{-}4\text{-}2)$$

On the other hand, when L is at a high level, i.e., in a region L>L_ifx, L1 and L2 are set, as described by:

$$L1=L/2+15 \text{ (region } L>L\_ifx) \quad (3\text{-}4\text{-}3)$$

$$L2=L/2-15 \text{ (region } L>L\_ifx) \quad (3\text{-}4\text{-}4)$$

In this way, the following equation always holds in the high-level region:

$$FL=L1-L2=30 \text{ (region } L>L\_ifx) \quad (3\text{-}4\text{-}5)$$

That is, in the high-level region L>L_ifx, the distribution rate of L2 is gradually increased with increasing L, and L1:L2=0.65:0.35 is nearly set when L is maximum. However, in the high-level region of L, since L1>L2 always holds, L2 never exceeds L/2, that is, 0.5.

In this embodiment, since FL is set to be an identical value within a permissible range in a high-level image region in which L>L_ifx, the FL value is prevented from outstanding in a specific region to avoid FL of that portion from dominantly deciding evaluation of overall flickers. In this way, since the distribution rates L1:L2 can be maximally biased to L1 on the premise of flickers within a permissible range, and occurrence of the "negative-side clipping phenomenon of high-frequency components" can be suppressed even in the high-level region.

Therefore, the low-frequency characteristics of this embodiment exhibit the following non-linear characteristics. That is, as shown in FIG. 6, the distribution rate of L1 is set to be especially large in a low-level region. In a high-level region in which L is equal to or higher than a predetermined level, graphs of L1 and L2 are set to be nearly parallel to L/2, and are respectively offset by FL/2 to have a graph of L/2 as the center, so that nearly uniform FL values are obtained in the entire region.

Parameter Effective Range

The effects of the non-linear characteristics like in this embodiment are effective when respective parameters fall within ranges specified based on the recognition level of general users. The effective ranges of respective parameters in this embodiment will be described below.

In a low-level region of L≤L_ifx, for example, when L_ifx=30, if the slope of L2 with respect to L is set to be 0.3 or less, 80% or more users feel that Hbtm_max is improved compared to the method of FIG. 4. If the slope is set to be 0.15 or less, 80% or more users feel that Hbtm_max is equivalent to the method of FIG. 3.

In a high-level region of L>L_ifx, at the frame frequency of 60 Hz, 80% users begin to feel flickers when FL=10, and they begin to feel unnatural about flickers when FL=50. In this embodiment, in order to quantitatively express this, a curve of L2 is expressed by the following mathematical expressions.

L2 is defined as a function F(L) of L:

$$L2=F(L) \quad (4\text{-}1\text{-}1)$$

In this case, since a larger value of functions f1(L) and f2(L) in the low-level region and high-level region of L2 is to be selected, F(L) is expressed by:

$$F(L)=\max(f1(L), f2(L)) \quad (4\text{-}1\text{-}2)$$

In practice, although the magnitudes of f1(L) and f2(L) are turned at L=L_ifx, this value is not included in an equation that defines the curve.

Let aa be the slope of f1(L) with respect to L, bb be the slope of f2(L) with respect to L, and FL/2 be the difference between f2(L) and L=L/2, as described by:

$$d(f1)/d(L)=aa \quad (4\text{-}2\text{-}1)$$

$$d(f2)/d(L)=bb \quad (4\text{-}3\text{-}1)$$

$$f2(L)=L/2-FL/2 \quad (4\text{-}3\text{-}2)$$

In this embodiment, the sufficient effects can be obtained by specifying, as parameters required to decide the aforementioned non-linear characteristics, the effective ranges of the slope aa and difference FL based on experiments that verify human vision like:

$$0 \leq aa<0.3 \quad (4\text{-}4\text{-}1)$$

$$0<FL<25 \quad (4\text{-}4\text{-}2)$$

Also, as the non-linear characteristics shown in FIG. 6 in this embodiment, since it is desirable that f2 is nearly parallel to L/2 and FL does not increase with increasing L, the slope bb is also specified as:

$$0.5 \leq bb<0.6 \quad (4\text{-}4\text{-}3)$$

As described above, according to this embodiment, since the low-frequency characteristics are specified as non-linear characteristics after the parameter ranges are limited, the distribution rate of L1 can be increased in the low-level region of L, and the bias of the distribution rates of L1 and L2 is reduced in the high-level region. In other words, the distribution rate of L2 is set to be relatively small in the low-level region of L, and is set to be relatively large within a range that does not exceed 0.5 in the high-level region of L.

In this manner, especially, the flicker suppression effect based on the "method of separating an image into spatial frequencies and distributing them to sub-frames" is maintained in the high-level region, and the "negative-side clipping phenomenon of high-frequency components" can be suppressed in the low-level region, thus assuring satisfactory moving image visibility.

Second Embodiment

The second embodiment according to the present invention will be described below. Since the arrangement of a moving image processing apparatus in the second embodiment is the same as that shown in FIG. 1 in the aforementioned first embodiment, a description thereof will not be repeated.

Non-Linear Filter Characteristics

Figure 7:
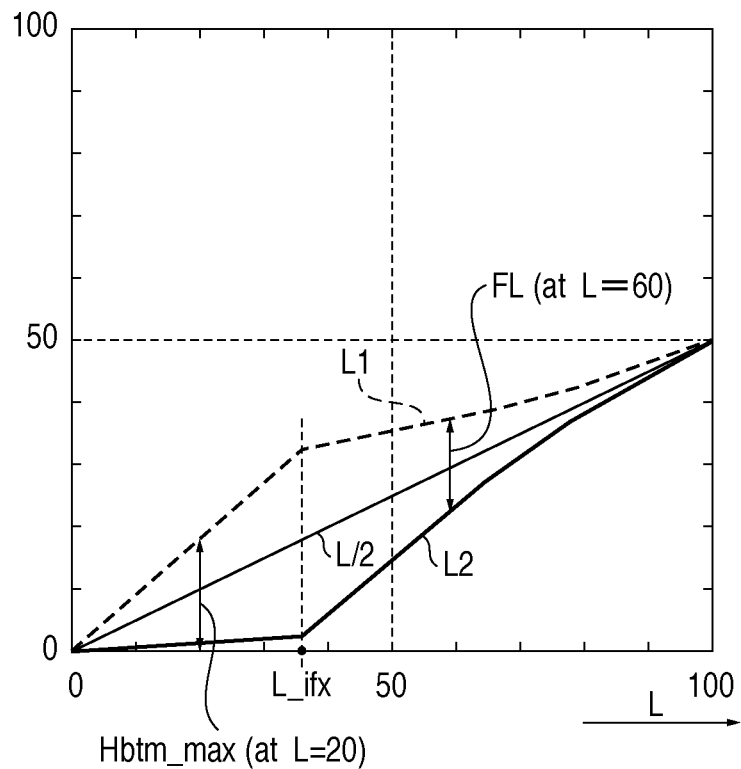
FIG. 7 is a graph showing non-linear characteristics of low-frequency components in the second embodiment.

FIG. 7 shows the non-linear characteristics of L1 and L2 in the non-linear filter 3 of the second embodiment. Note that FIG. 7 also has the same scale as in FIG. 6 in the first embodiment, and an L value serving as an inflection point of characteristic curves (straight lines in FIG. 7) is represented by L_ifx.

As shown in FIG. 7, as the non-linear characteristics in the second embodiment, the difference between L1 and L2 becomes smaller with increasing L level in a region of L>L_ifx in which the level of L is high unlike in the aforementioned first embodiment.

The differences between the first and second embodiments will be described in detail below. The first factor of deciding a user's flicker recognition level lies in flickers of a portion where an FL value is largest on a screen. The second factor lies in flickers based on the sum total of FL values on the entire screen.

In the aforementioned first embodiment, the first factor, that is, the maximum FL value on the screen is suppressed by assuring a predetermined value as a maximum value Hbtm_max that the minus side of high-frequency components H can assume especially in a low-level region of L. That is, an outstanding portion of the FL value is avoided from being formed in a region of L>L_ifx on the screen.

On the other hand, the second embodiment is characterized in that the predetermined value is assured as Hbtm_max especially in the low-level region of L as in the first embodiment, and the second factor, that is, the sum total of FL values on the entire screen is reduced as much as possible.

In the second embodiment, priority for each level of L is considered upon assuring Hbtm_max as the predetermined value. More specifically, top priority is given to assure large Hbtm_max in a portion where the level of L is small. Then, priority is given to reduce the difference between L1 and L2 rather than Hbtm_max with increasing level of L.

The characteristics of the non-linear filter 3 shown in FIG. 7 are quantitatively expressed as follows. As in the first embodiment (FIG. 6), L2 is defined as a function of F(L) of L:

$$L2=F(L) \quad (5\text{-}1\text{-}1)$$

In this case, since a larger value of functions f1(L) and f2(L) in the low-level region and high-level region of L2 is to be selected, F(L) is expressed by:

$$F(L)=\max(f1(L), f2(L)) \quad (5\text{-}1\text{-}2)$$

Therefore, in practice, L2 is expressed to have L=L_ifx as a boundary by:

When $L \leq L\_ifx$, $L2=f1(L)$ (5-1-3)

When $L > L\_ifx$, $L2=f2(L)$ (5-1-4)

As in the first embodiment, let aa be the slope of f1(L) with respect to L, and bb be the slope of f2(L) with respect to L:

$$d(f1)/d(L)=aa \quad (5\text{-}2\text{-}1)$$

$$d(f2)/d(L)=bb \quad (5\text{-}3\text{-}1)$$

In the second embodiment, as for a level lower than the inflection point L_ifx, since the idea about the slope of f1(L) is the same as the aforementioned first embodiment, the effective range of the slope aa is specified, in the same manner as in the first embodiment, by:

$$0 \leq aa < 0.3 \quad (5\text{-}4\text{-}1)$$

As for a level higher than the inflection point L_ifx, since the slope bb of f2(L) is equal to or larger than that of L2=L/2, that is, 0.5, the effective range of the slope bb is specified by:

$$0.5 \leq bb \quad (5\text{-}4\text{-}2)$$

On the other hand, f2(L) does not exceed L2=L/2, as described by:

$$f2(L) \leq L/2 \quad (5\text{-}4\text{-}3)$$

From the specifications of inequalities (5-4-1), (5-4-2), and (5-4-3), we have:

$$d(FL(L))/dL \leq 0 \quad (5\text{-}4\text{-}4)$$

As is understood from inequality (5-4-4), FL as the difference between L1 and L2 becomes smaller with increasing level of L. Then, the second factor, that is, the sum total of the FL values on the entire screen can be reduced.

As described above, according to the second embodiment, since the non-linear characteristics of the non-linear filter 3 are specified to decrease FL in a higher-level region, flickers can be further suppressed compared to the aforementioned first embodiment.

Third Embodiment

The third embodiment according to the present invention will be described below. The third embodiment is characterized in that adaptive non-linear control is implemented by correcting the characteristics of a non-linear filter (the slope in a high-level region) with respect to low-frequency components according to the level of high-frequency components included in an input image in addition to the aforementioned second embodiment.

System Arrangement

Figure 2A:
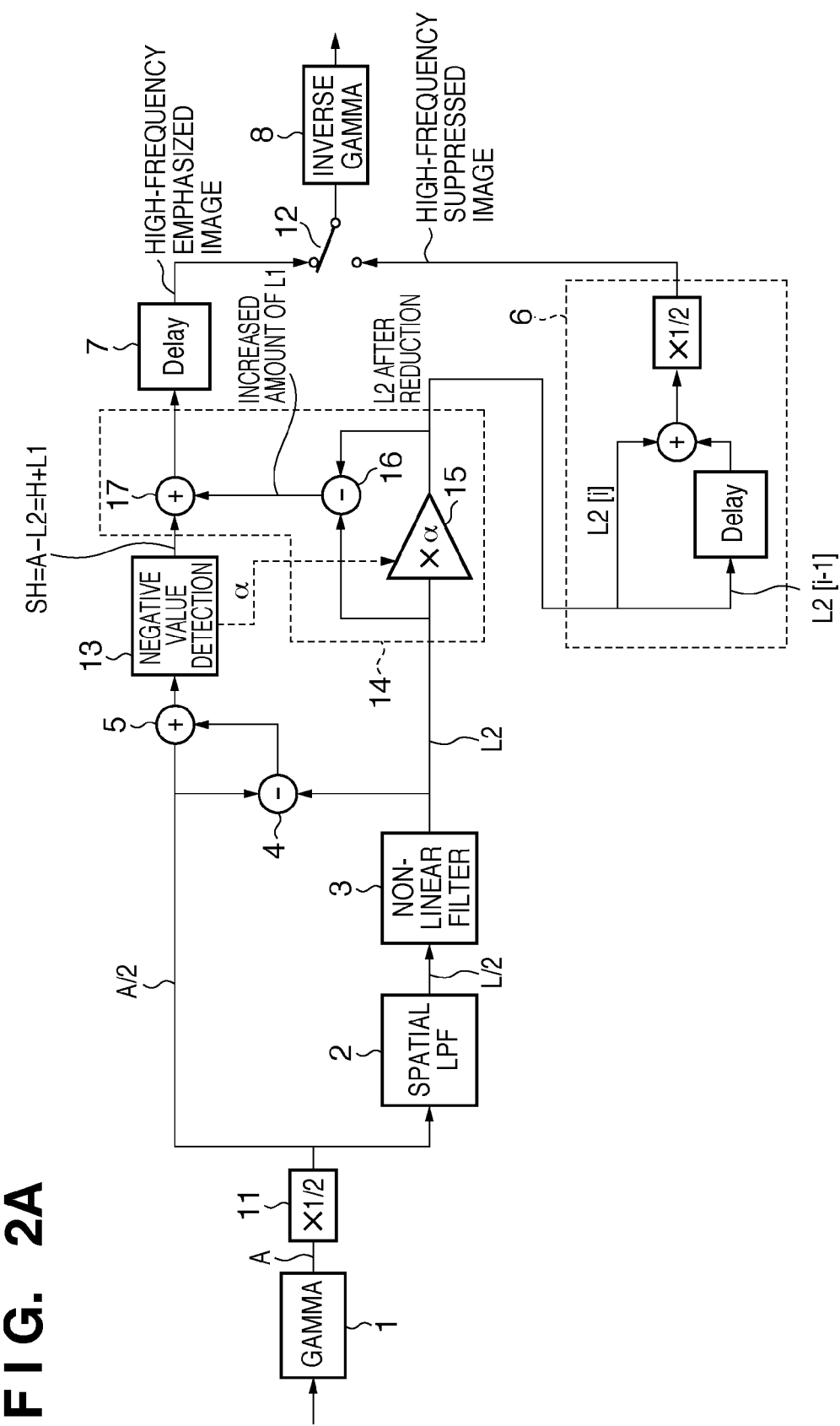
FIG. 2A is a block diagram showing the arrangement of a moving image processing apparatus according to the third embodiment.

FIG. 2A is a block diagram showing the arrangement of a moving image processing apparatus according to the third embodiment. FIG. 2A is characterized in that a negative value detection unit 13 and distribution correction unit 14 are added to the block arrangement shown in FIG. 1 in the first embodiment.

The negative value detection unit 13 searches SH values before correction on an entire image for a negative value having a largest absolute value (negative peak value), decides a reduction rate a based on this negative peak value, and passes the reduction rate a to the distribution correction unit 14. In the third embodiment, as will be described later, the magnitude of L2=F(L) is controlled to be reduced to have the same rate (reduction rate a) with respect to all components L.

The distribution correction unit 14 includes a multiplier 15, subtracter 16, and adder 17. The multiplier 15 reduces the L2 value according to the reduction rate α. Then, the subtracter 16 calculates a difference before and after the multiplier 15 as a decreased amount of L2 due to the reduction, and the adder 17 adds the decreased amount to the SH side.

In the third embodiment, with the above arrangement, L2 is controlled according to the reduction rate, and L1+L2 is controlled to be a constant value (i.e., L), thus consequently controlling L1 to be a predetermined value. In this manner, target non-linear control of the third embodiment can be implemented.

In the third embodiment, with the arrangement shown in FIG. 2A, an effect practically equivalent to that obtained upon changing the characteristics of the non-linear filter 3 can be obtained by correcting the output from the non-linear filter 3 without directly changing the non-linear filter 3.

In the negative value detection unit 13, an initial value of α is 1. However, upon detection of a negative peak value, α assumes a positive value less than 1 based on the negative peak value. With increasing negative peak value, α becomes smaller, L2 is reduced more largely, and L1 increases accordingly. As a result, the negative-side clipping phenomenon in SH can be avoided. Since α becomes larger and L2 increases with decreasing negative peak value, flickers can be suppressed effectively. Note that α is not initialized at the time of processing of the next frame to leave the influence of the previous negative peak value.

Figure 12:
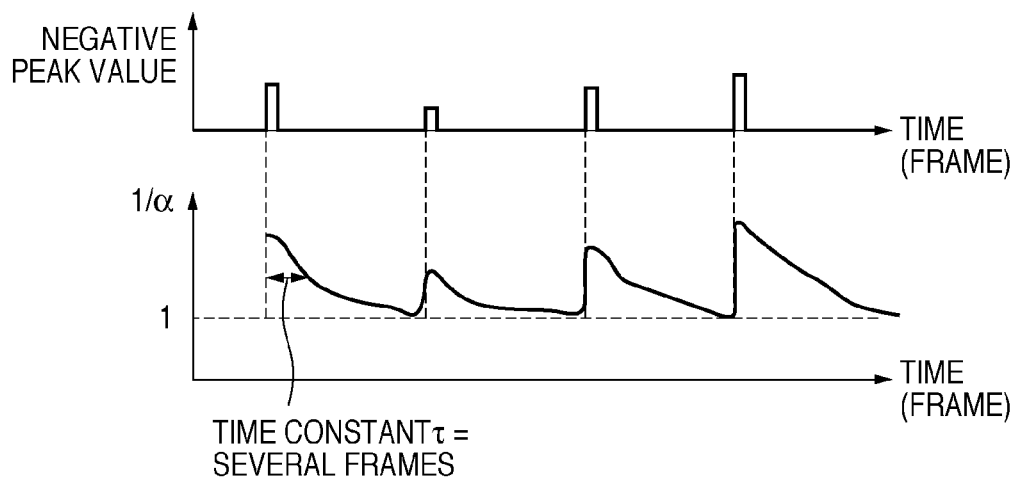
FIG. 12 is a graph showing an example of response characteristics of a reduction rate a in the third embodiment.

FIG. 12 shows an example of response characteristics of α (indicated as 1/α) in the third embodiment. According to FIG. 12, α exhibits response characteristics which change in correspondence with the negative peak value, and slowly return to 1 by attenuation characteristics of a time constant τ. It is desirable that the magnitude of the time constant τ corresponds to several to ten odd frames.

Generation Processing of SH and SL

Figure 10:
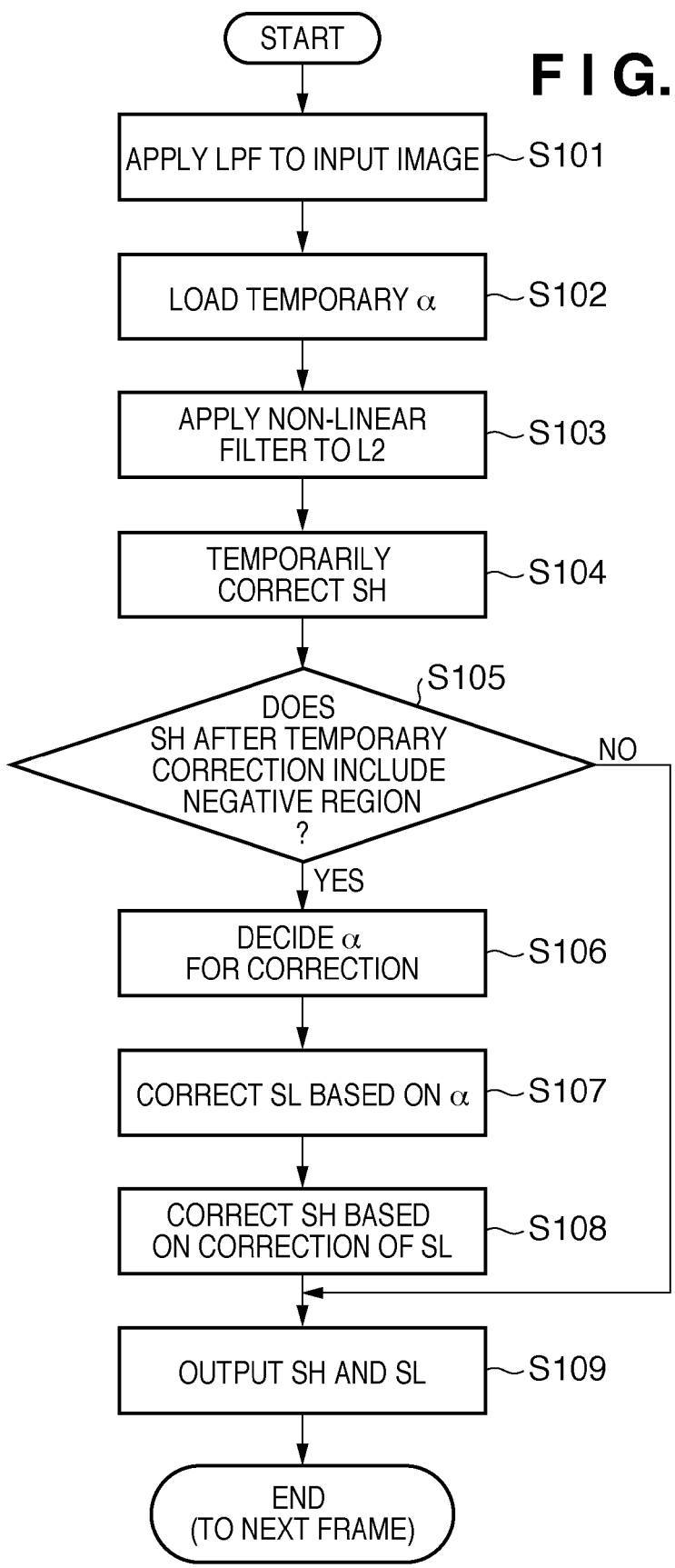
FIG. 10 is a flowchart showing the generation processing of SH and SL in the third embodiment.

The generation processing of SH and SL for one frame in the third embodiment will be described below with reference to the flowchart of FIG. 10.

In step S101, the spatial LPF 2 is applied to an input image. In step S102, the distribution correction unit 14 controls a loading unit (not shown) to load an α value at that time (to be referred to as temporary α hereinafter) based on the response characteristics shown in FIG. 12. Then, L2 is calculated using the non-linear filter 3 in step S103.

In step S104, the distribution correction unit 14 temporarily corrects SH based on the temporary α and L2. In step S105, the distribution correction unit 14 controls a control unit (not shown) to detect whether or not SH temporarily corrected in step S104 includes a negative region. If SH includes a negative region, the process advances to step S106; otherwise, the process jumps to step S109.

In step S106, the negative value detection unit 13 calculates a new α value based on the negative peak value of SH. In step S107, the distribution correction unit 14 corrects (reduces) SL based on α newly calculated in step S106. In step S108, the distribution correction unit 14 corrects SH based on the correction amount of SL.

In step S109, SH and SL calculated by the distribution correction unit 14 are output, thus ending the processing of the frame of interest.

Non-Linear Filter Characteristics

Figure 8:
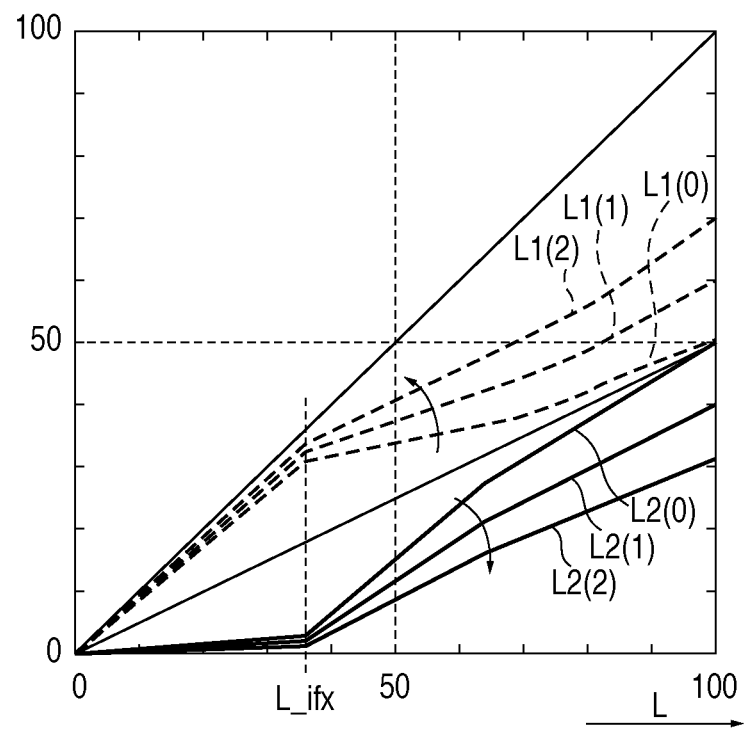
FIG. 8 is a graph showing non-linear characteristics of low-frequency components in the third embodiment.

FIG. 8 shows an example in which the adaptive control according to the third embodiment is applied to the non-linear characteristics of L1 and L2 in low-frequency components. Note that FIG. 8 also has the same scale as in FIG. 7 in the aforementioned second embodiment, and an L value serving as an inflection point of characteristic curves (straight lines in FIG. 8) is represented by L_ifx. The non-linear characteristics in the third embodiment are basically the same as those defined by formulas (5-1-1) to (5-4-4) in the aforementioned second embodiment.

As described above, in the third embodiment, the magnitude of L2=F(L) is reduced to have the same rate with respect to all components L based on the negative peak value detected by the negative value detection unit 13. In the third embodiment, letting a be the reduction rate as a result of the above control, equations (5-1-1), (5-1-3), and (5-1-4) in the aforementioned second embodiment can be expressed by respectively replacing them by:

$$L2 = \alpha \times F(L) \tag{6-1}$$

$$\text{When } L \leq L\_ifx, L2 = \alpha \times f1(L) \tag{6-2}$$

$$\text{When } L > L\_ifx, L2 = \alpha \times f2(L) \tag{6-3}$$

In this manner, in the third embodiment, L1 and L2 are adaptively controlled according to the reduction rate α like L1(0) and L2(0), and L1(1) and L2(1), as shown in FIG. 8.

As described above, according to the third embodiment, the slope in the high-level region in the characteristics of the non-linear filter 3 is corrected according to the level of spatial high-frequency components included in an input image in addition to the aforementioned second embodiment. Then, flickers can be suppressed, and the negative-side clipping phenomenon in SH can be effectively avoided.

Fourth Embodiment

The fourth embodiment according to the present invention will be described below. The fourth embodiment is characterized in that adaptive non-linear control is implemented by changing the characteristics (inflection point) of a non-linear filter with respect to low-frequency components in accordance with the level of spatial high-frequency components included in an input image in addition to the aforementioned second embodiment.

System Arrangement

Figure 2B:
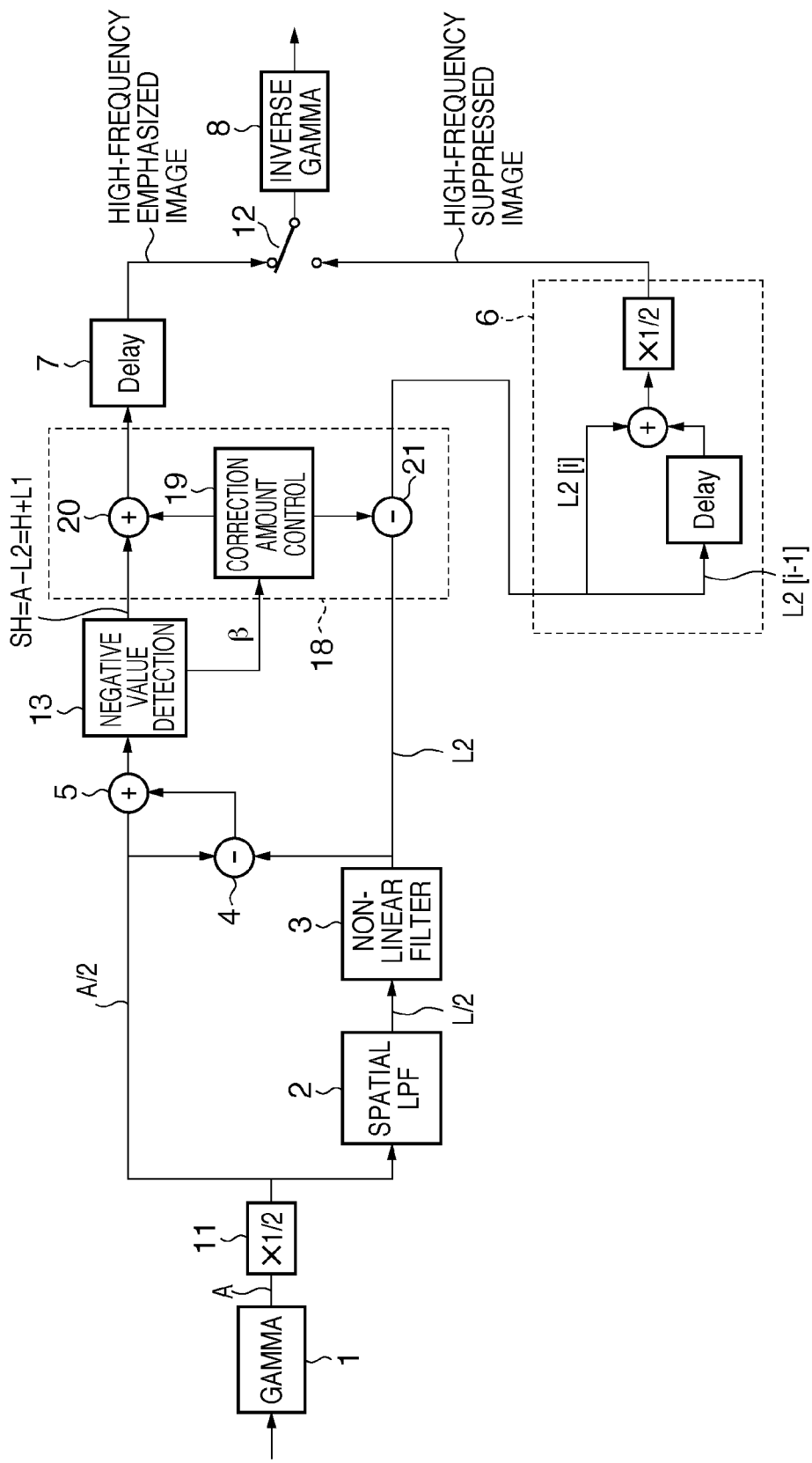
FIG. 2B is a block diagram showing the arrangement of a moving image processing apparatus according to the fourth embodiment.

FIG. 2B is a block diagram showing the arrangement of a moving image processing apparatus according to the fourth embodiment. FIG. 2B is characterized in that a negative value detection unit 13 and non-linear correction unit 18 are added to the block arrangement shown in FIG. 1 in the first embodiment.

The negative value detection unit 13 searches SH values before correction on an entire image before correction for a largest negative value (negative peak value) as in the aforementioned third embodiment, decides an offset correction amount β based on this negative peak value, and passes the offset correction amount β to the non-linear correction unit 18. In the non-linear correction unit 18, a correction amount control unit 19 decides an actual correction amount according to the offset correction amount β. A subtracter 21 subtracts the correction amount from L2 to generate SL. On the other hand, an adder 20 adds the correction amount to L1 to generate SH.

In the fourth embodiment, with the arrangement shown in FIG. 2B, an effect practically equivalent to that obtained upon changing the characteristics of the non-linear filter 3 can be obtained by correcting the output from the non-linear filter 3 without directly changing the non-linear filter 3.

In the negative value detection unit 13, an initial value of β is 0. Upon detection of a negative peak value, a predetermined value is set in β based on the negative peak value. That is, with increasing negative peak value, larger β is subtracted from L2, and L1 increases accordingly. Then, the negative-side clipping phenomenon in SH can be avoided. Since β becomes smaller and L2 increases more with decreasing negative peak value, the bias of the distribution rates of L1 and L2 can be reduced more, thus effectively suppressing flickers. Note that β is not initialized at the time of processing of the next frame to leave the influence of the previous negative peak value.

Figure 13:
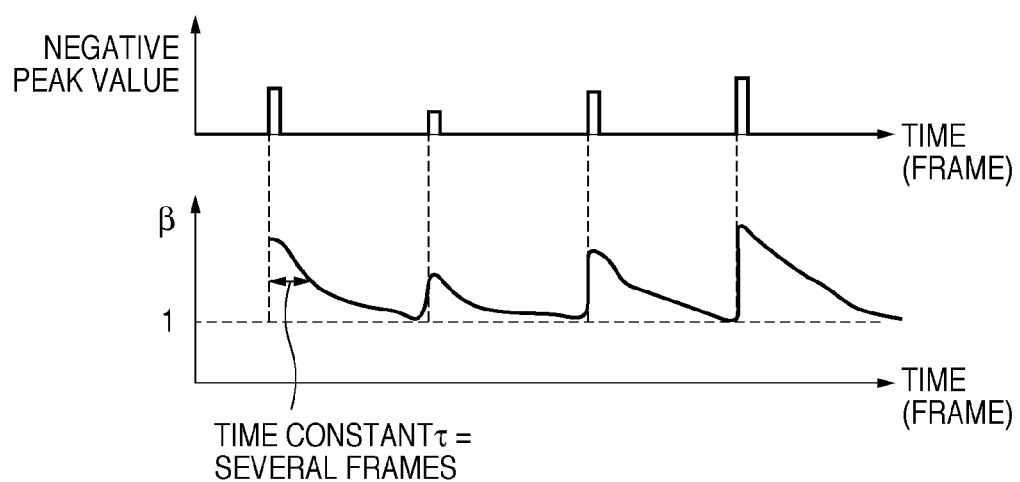
FIG. 13 is a graph showing an example of response characteristics of an offset amount β in the fourth embodiment.

FIG. 13 shows an example of the response characteristics of β in the fourth embodiment. According to FIG. 13, β exhibits response characteristics which change in correspondence with the negative peak value, and slowly return to zero by attenuation characteristics of a time constant τ. It is desirable that the magnitude of the time constant τ corresponds to several to ten several frames.

Generation Processing of SH and SL

Figure 11:
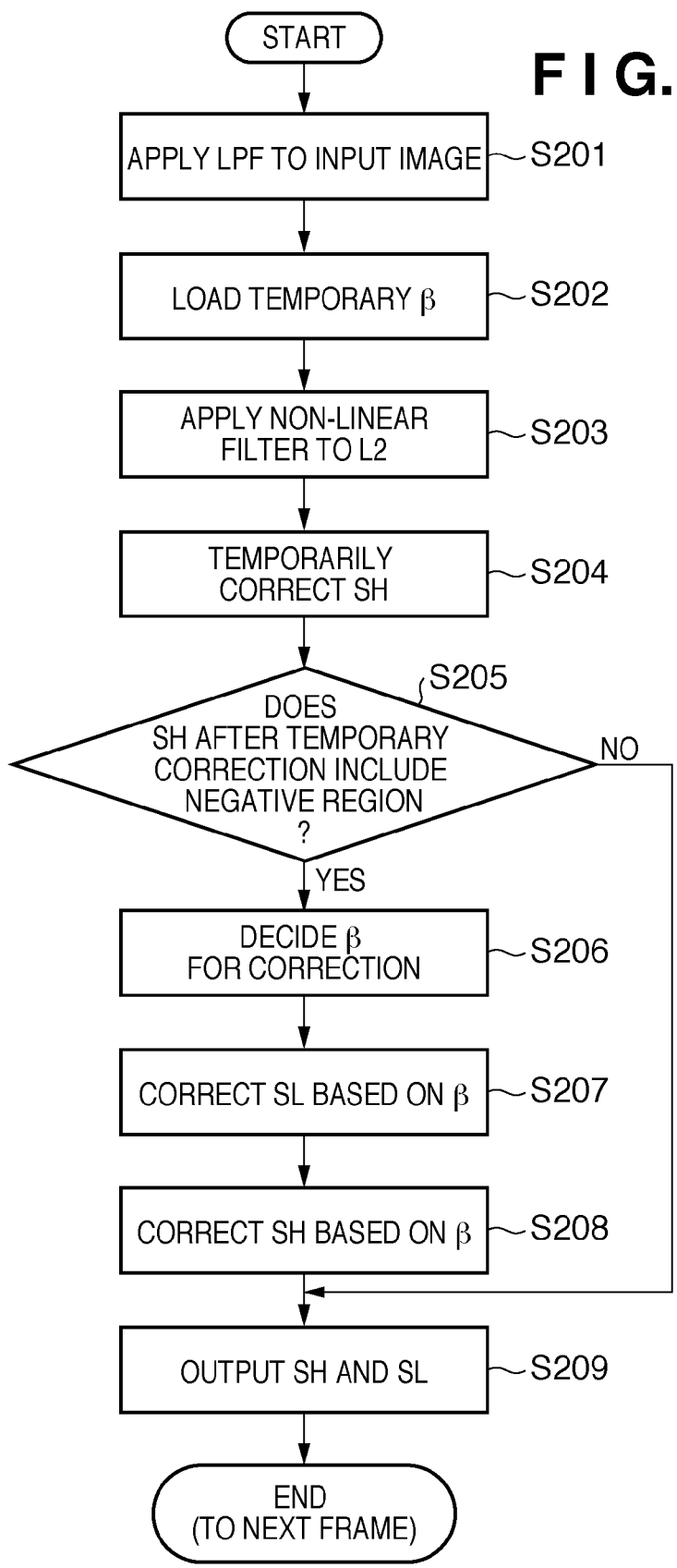
FIG. 11 is a flowchart showing the generation processing of SH and SL in the fourth embodiment.

The generation processing of SH and SL for one frame in the fourth embodiment will be described below with reference to the flowchart of FIG. 11.

In step S201, the spatial LPF 2 is applied to an input image. In step S202, the non-linear correction unit 18 controls a loading unit (not shown) to load a β value at that time (to be referred to as temporary β hereinafter) based on the response characteristics shown in FIG. 13. Then, L2 is calculated using the non-linear filter 3 in step S203.

In step S204, the non-linear correction unit 18 temporarily corrects SH based on the temporary β and L2. In step S205, the non-linear correction unit 18 controls a control unit (not shown) to detect whether or not SH temporarily corrected in step S204 includes a negative region. If SH includes a negative region, the process advances to step S206; otherwise, the process jumps to step S209.

In step S206, the negative value detection unit 13 calculates a new β value based on the negative peak value of SH. In step S207, the non-linear correction unit 18 corrects SL (by subtraction offsetting) based on β newly calculated in step S206. In step S208, the non-linear correction unit 18 corrects SH (by addition offsetting) in an opposite direction by the same amount as SL.

In step S209, SH and SL calculated by the non-linear correction unit 18 are output, thus ending the processing of the frame of interest.

Non-Linear Filter Characteristics

Figure 9:
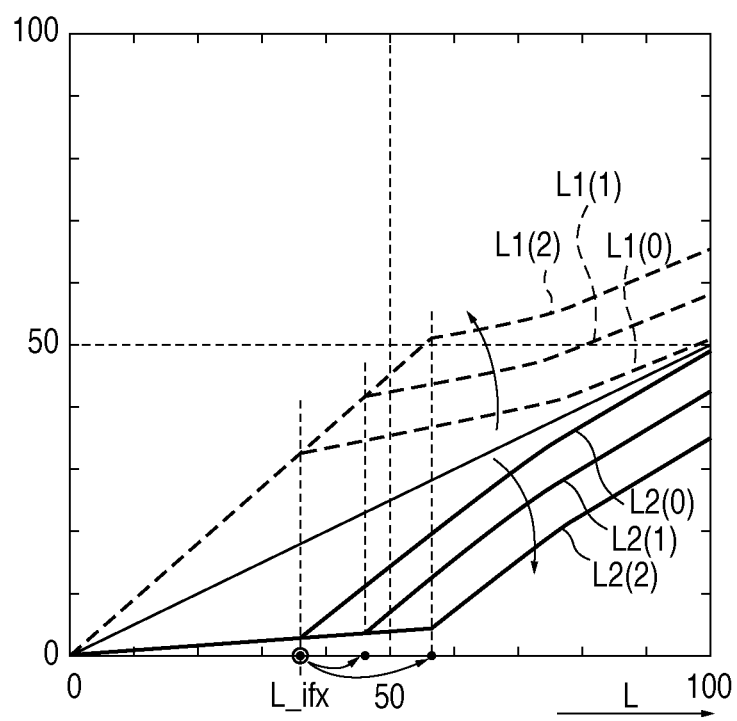
FIG. 9 is a graph showing non-linear characteristics of low-frequency components in the fourth embodiment.

FIG. 9 shows an example in which the adaptive control according to the fourth embodiment is applied to the non-linear characteristics of L1 and L2 in low-frequency components. Note that FIG. 9 also has the same scale as in FIG. 7 in the aforementioned second embodiment, and an L value serving as an inflection point of characteristic curves (straight lines in FIG. 9) is represented by L_ifx. The non-linear characteristics in the fourth embodiment are basically the same as those defined by formulas (5-1-1) to (5-4-4) in the aforementioned second embodiment.

As shown in FIG. 9, in the fourth embodiment, non-linear characteristics f2(L) on the higher-level side than the inflection point (i.e., the L2 value with respect to L on the higher-level side than the inflection point) are offset downward based on the negative peak value detected by the negative value detection unit 13. For this reason, in the fourth embodiment, equation (5-1-2) in the aforementioned second embodiment can be expressed by replacing it by:

$$F(L)=\max(f1(L), f2(L)-\beta) \qquad (6\text{-}4\text{-}1)$$

where β indicates an actual subtraction offset amount.

As can be seen from FIG. 9, according to the subtraction offset amount for the L2 value, the L1 value undergoes addition offsetting by the same amount.

In the fourth embodiment, as can be seen from FIG. 9, subtraction offsetting is applied to L2 according to the negative peak value of SH, the inflection point L_ifx is consequently offset as the non-linear characteristics. That is, the inflection point L_ifx is offset in a direction to increase L with increasing negative peak value of SH.

As described above, according to the fourth embodiment, the inflection point in the characteristics of the non-linear filter 3 is offset-controlled according to the level of spatial high-frequency components included in an input image in addition to the aforementioned second embodiment. Then, flickers can be suppressed, and the negative-side clipping phenomenon in SH can be avoided more effectively.

Figure 2C:
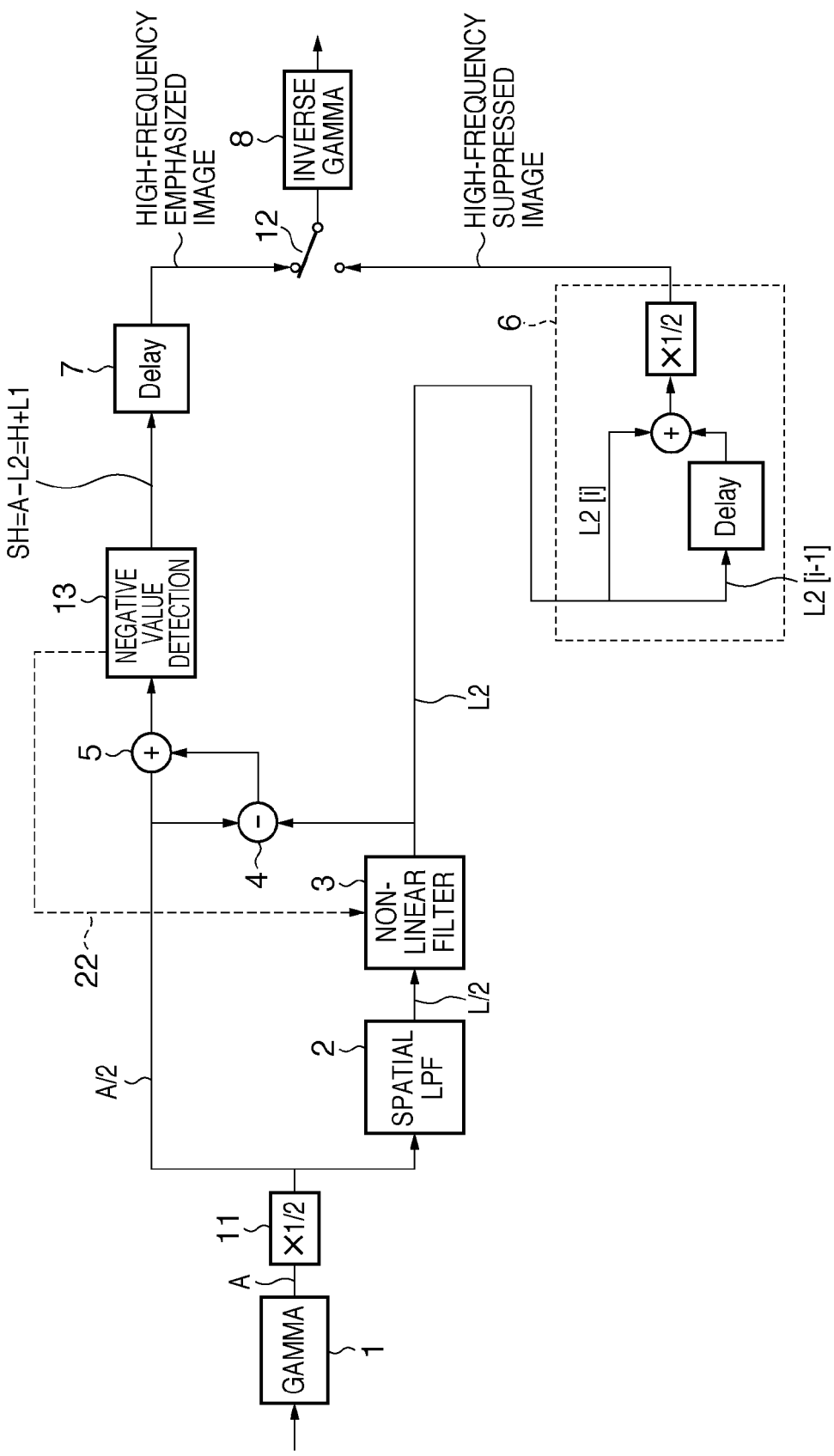
FIG. 2C is a block diagram showing a modification of the arrangement of the moving image processing apparatus according to the third and fourth embodiments.

Note that the aforementioned third and fourth embodiments can also be implemented by the arrangement shown in FIG. 2C. According to FIG. 2C, a correction parameter (corresponding to α in the third embodiment or β in the fourth embodiment) calculated by the negative value detection unit 13 is fed back to the non-linear filter 3 to control the characteristics of the non-linear filter 3 itself. With this arrangement, since the need for adding an arrangement for correction after the non-linear filter 3 can be obviated, the degree of freedom in correction method can be enhanced. However, with this arrangement, a time response is inferior to the case in which correction is made after the non-linear filter 3 in the aforementioned third and fourth embodiments.

The present invention can adopt embodiments in the forms of, for example, a system, apparatus, method, program, and storage medium. The present invention may be applied to either a system constituted by a plurality of devices, or an apparatus consisting of a single device.

According to the present invention with the aforementioned arrangement, the following effects can be obtained upon concentrating high-frequency components for one frame on a first sub-frame and distributing low-frequency components to first and second sub-frames. That is, since flickers are preferentially suppressed in a high-level region, and the negative-side clipping phenomenon of high-frequency components is preferentially suppressed in a low-level region, the moving image visibility can be improved.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-003991 filed on Jan. 9, 2009, which is hereby incorporated by reference herein in its entirety.

The invention claimed is:

1. A moving image processing apparatus which concentrates high-frequency components in image data for one frame on a first sub-frame, and distributes low-frequency components to the first sub-frame and a second sub-frame upon generating image data of two sub-frames based on the image data for one frame, said apparatus comprising:
    an extraction unit configured to extract low-frequency components L from image data of a frame of interest;
    a distribution unit configured to decide a distribution of second low-frequency components L2 in the low-frequency components L so as to distribute the low-frequency components L to the first sub-frame SH and the second sub-frame SL as first low-frequency components L1 and the second low-frequency components L2;
    a first sub-frame generation unit configured to generate the first sub-frame SH as a sum of the first low-frequency components L1 in the low-frequency components L and high-frequency components H in the frame of interest by subtracting the second low-frequency components L2 from the image data of the frame of interest; and
    a second sub-frame generation unit configured to generate the second sub-frame SL based on the second low-frequency components L2,
    wherein when a level of the low-frequency components L falls in a low-level region in which the level is lower than a predetermined boundary level, said distribution unit sets a distribution rate of the second low-frequency components L2 to be relatively smaller than when the level of the low-frequency components L falls within a high-level region in which the level is higher than the boundary level, and when the level of the low-frequency components L falls within the high-level region, said distribution unit sets the distribution rate of the low-frequency components L2 to be relatively larger within a range that does not exceed 0.5 than when the level falls within the low-level region.

2. The apparatus according to claim 1, wherein said second sub-frame generation unit generates the second sub-frame corresponding to the frame of interest by averaging the second low-frequency components L2 in the frame of interest and an immediately preceding frame.

3. The apparatus according to claim 1, wherein said distribution unit distributes the second low-frequency components L2 to have non-linear characteristics with respect to a level of the low-frequency components L, and an inflection point of the non-linear characteristics serves as the boundary level.

4. The apparatus according to claim 1, wherein said distribution unit decides the distribution of the second low-frequency components L2, so that the distribution rate of the second low-frequency components L2 approaches zero when the low-frequency components L fall within the low-level region, and a difference FL between the first low-frequency components L1 and the second low-frequency components L2 becomes constant when the low-frequency components L fall within the high-level region.

5. The apparatus according to claim 4, wherein said distribution unit decides the distribution of the second low-frequency components L2 so that a slope aa of the second low-frequency components L2 with respect to the low-frequency components L when the low-frequency components L fall within the low-level region meets $0 \leq aa < 3.0$, and the difference FL between the second low-frequency components L2 and the first low-frequency components L1 meets $0 < FL < 25$.

6. The apparatus according to claim 1, wherein said distribution unit decides the distribution of the second low-frequency components L2, so that the distribution rate of the second low-frequency components L2 approaches zero when the low-frequency components L fall within the low-level region, and a difference FL between the first low-frequency components L1 and the second low-frequency components L2 becomes smaller with increasing level of the low-frequency components L when the low-frequency components L fall within the high-level region.

7. The apparatus according to claim 6, further comprising:
a negative value detection unit configured to detect a negative value having a largest absolute value as a negative peak value from the first sub-frame SH generated by said first sub-frame generation unit; and
a distribution correction unit configured to correct the distribution of the second low-frequency components L2 decided by said distribution unit based on the negative peak value.

8. The apparatus according to claim 7, wherein said distribution correction unit corrects the distribution of the second low-frequency components L2 to decrease the difference FL between the first low-frequency components L1 and the second low-frequency components L2 with decreasing the negative peak value when the low-frequency components L fall within the high-level region.

9. The apparatus according to claim 7, wherein said distribution correction unit corrects a slope with respect to the low-frequency components L by reducing the second low-frequency components L2 larger with decreasing negative peak value.

10. The apparatus according to claim 7, wherein said distribution correction unit offsets the boundary level in the low-frequency components L by increasing an offset amount to be subtracted from the second low-frequency components L2 with decreasing negative peak value.

11. A moving image processing method which concentrates high-frequency components in image data for one frame on a first sub-frame, and distributes low-frequency components to the first sub-frame and a second sub-frame upon generating image data of two sub-frames based on the image data for one frame, the method comprising:
an extraction step of extracting low-frequency components L from image data of a frame of interest;
a distribution step of deciding a distribution of second low-frequency components L2 in the low-frequency components L so as to distribute the low-frequency components L to the first sub-frame SH and the second sub-frame SL as first low-frequency components L1 and the second low-frequency components L2;
a first sub-frame generation step of generating the first sub-frame SH as a sum of the first low-frequency components L1 in the low-frequency components L and high-frequency components H in the frame of interest by subtracting the second low-frequency components L2 from the image data of the frame of interest; and
a second sub-frame generation step of generating the second sub-frame SL based on the second low-frequency components L2,
wherein in the distribution step, when a level of the low-frequency components L falls in a low-level region in which the level is lower than a predetermined boundary level, a distribution rate of the second low-frequency components L2 is set to be relatively smaller than when the level of the low-frequency components L falls within a high-level region in which the level is higher than the boundary level, and when the level of the low-frequency components L falls within the high-level region, the distribution rate of the low-frequency components L2 is set to be relatively larger within a range that does not exceed 0.5 than when the level falls within the low-level region.

12. The method according to claim 11, wherein in the second sub-frame generation step, the second sub-frame corresponding to the frame of interest is generated by averaging the second low-frequency components L2 in the frame of interest and an immediately preceding frame.

13. The method according to claim 11, wherein in the distribution step, the second low-frequency components L2 are distributed to have non-linear characteristics with respect to a level of the low-frequency components L, and an inflection point of the non-linear characteristics serves as the boundary level.

14. A non-transitory computer-readable storage medium storing a computer program which, when executed by a computer, causes the computer to execute each step in the method according to claim 11.

15. A moving image processing apparatus which concentrates high-frequency components in image data for one frame on a first sub-frame, and distributes low-frequency components to the first sub-frame and a second sub-frame upon generating image data of two sub-frames based on the image data for one frame, said apparatus comprising:
a distribution unit configured to decide a distribution of first low-frequency components L1 so as to distribute the first sub-frame and a distribution of second low-frequency components L2 so as to distribute the second sub-frame, based on low-frequency components L from image data of a frame of interest; and
a sub-frame generation unit configured to generate the first sub-frame SH and the second sub-frame SL based on the low-frequency components L1 and L2 distributed by the distribution unit,
wherein when a level of the low-frequency components L falls in a low-level region in which the level is lower than a predetermined boundary level, said distribution unit sets a distribution rate of the second low-frequency components L2 to be relatively smaller than when the level of the low-frequency components L falls within a high-level region in which the level is higher than the boundary level.

16. The apparatus according to claim 15, wherein when the level of the low-frequency components L falls within the high-level region, said distribution unit sets the distribution rate of the low-frequency components L2 to be relatively larger than when the level falls within the low-level region.

17. The apparatus according to claim 15, wherein said distribution unit distributes the second low-frequency components L2 to have non-linear characteristics with respect to a level of the low-frequency components L, and an inflection point of the non-linear characteristics serves as the boundary level.

18. A moving image processing method which concentrates high-frequency components in image data for one frame on a first sub-frame, and distributes low-frequency components to the first sub-frame and a second sub-frame upon generating image data of two sub-frames based on the image data for one frame, the method comprising:

a distribution step of deciding a distribution of first low-frequency components L1 so as to distribute the first sub-frame and a distribution of second low-frequency components L2 so as to distribute the second sub-frame, based on low-frequency components L from image data of a frame of interest; and a sub-frame generation step of generating the first sub-frame SH and the second sub-frame SL based on the low-frequency components L1 and L2 distributed by the distribution unit, wherein, in the distribution step, when a level of the low-frequency components L falls in a low-level region in which the level is lower than a predetermined boundary level, a distribution rate of the second low-frequency components L2 is set to be relatively smaller than when the level of the low-frequency components L falls within a high-level region in which the level is higher than the boundary level.

19. A non-transitory computer-readable storage medium storing a computer program which, when executed by a computer, causes the computer to execute each step in the method according to claim 18.

* * * * *